March 12, 1929.  C. A. HENNEUSE  1,704,857
TRACTOR TREAD
Original Filed Jan. 22, 1923  2 Sheets-Sheet 1
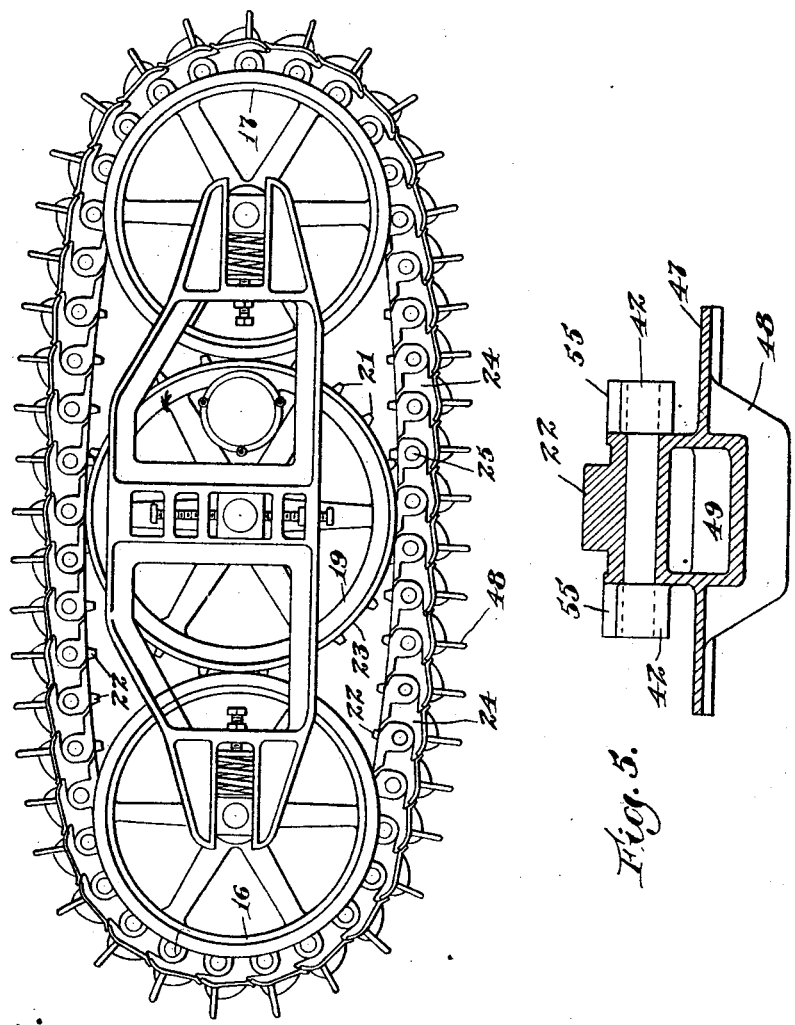

March 12, 1929.  C. A. HENNEUSE  1,704,857
TRACTOR TREAD
Original Filed Jan. 22, 1923   2 Sheets-Sheet 2
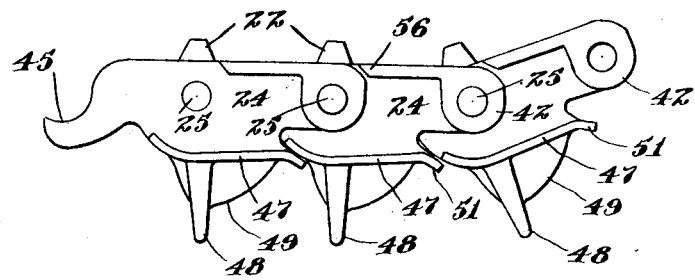
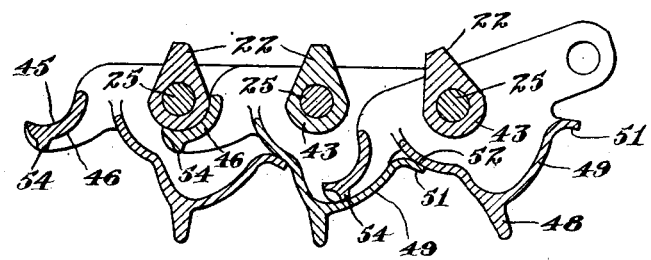
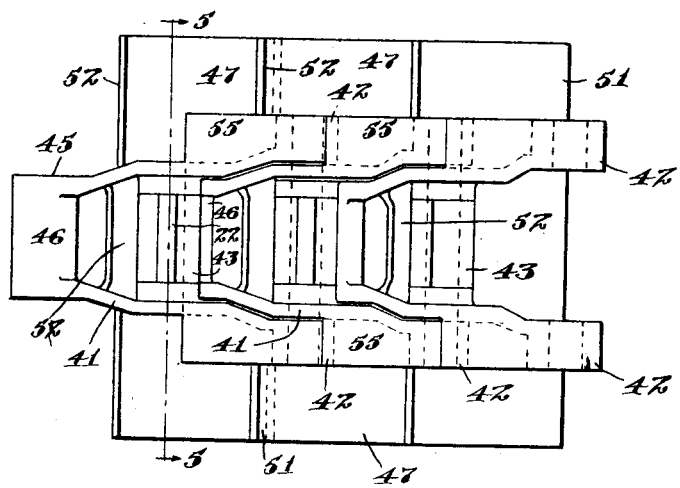
Inventor
Clarence A. Henneuse
by James P. Hodder
Attorney Patented Mar. 12, 1929.

1,704,857

UNITED STATES PATENT OFFICE.

CLARENCE A. HENNEUSE, OF SACRAMENTO, CALIFORNIA, ASSIGNOR TO HADFIELD-PENFIELD STEEL COMPANY, OF BUCYRUS, OHIO, A CORPORATION OF OHIO.

TRACTOR TREAD.

Refile of abandoned application Serial No. 614,185, filed January 22, 1923. This application filed June 20, 1925. Serial No. 38,548.

The invention relates to tractor treads of the creeper type.

This application is a refile of my abandoned application Serial No. 614,185, filed in the United States Patent Office, January 22, 1923.

An object of the invention is to provide a track which can be driven over the ground with a minimum of resistance.

Another object of the invention is to provide a self-supporting track in which wear is reduced to a minimum, and which is capable of efficient operation on uneven or marshy ground and sand.

A further object of the invention is to provide a track mounting which is adjustable to maintain it in operative position to produce the above mentioned advantages.

A further object of the invention is to provide a track which lies in a flat arc in contact with the ground, so that while the weight of the tractor is distributed over a large area the pressure at the center of the track is greater than at other points thereon, so that the tractor may be readily turned.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one form of tractor of my invention but it is to be understood that I do not limit myself to such form, since the invention as set forth in the claims may be embodied in a plurality of forms.

Referring to the said drawings;

Fig. 1 is a side elevation of the track and track frame;

Fig. 2 is a side elevation of several connected track links;

Fig. 3 is a longitudinal vertical section through several connected track links;

Fig. 4 is a plan or top view of several connected track links;

Fig. 5 is a transverse vertical section through a link, taken on the line 5—5 Figure 4.

In the construction of a tractor of the creeper type, two endless treads or tracks are usually employed, one track being disposed on each side of the tractor. Each track consists of a series of links or shoes 24, hinged together by the pins 25. The links are constructed so that when hinged together, they form a track flexible in one direction and rigid in the opposite direction, that is, the links are free to move to form a convex track as when passing over the idlers 17, but cannot move to form a concave track. The links are preferably formed so that the portion of the track which lies in contact with the ground is slightly convex or curved downwardly and the driving sprocket 19 engages the track at the center of the convexity. This track construction produces a rigid track surface at all times, regardless of the condition of the ground surface, enabling the track to bridge small inequalities of the ground surface and to travel over soft ground and distributes the weight of the tractor evenly over soft ground, in both instances reducing the rolling resistance to a minimum. The curvature of the track in contact with the ground enables the tractor to be readily and quickly steered and permits it to smoothly operate over rough ground.

The sprocket wheel is of greater diameter than the idler wheels and is provided with teeth 21 which engage teeth 22 on the track links and is provided with tread surfaces 23 at the pitch line which engage on the rollway of the track, so that the sprocket also carries a large portion of the weight of the tractor, thus reducing the strain on the track and track supports.

The idler wheels 16 and 17 are adjustable longitudinally so that the track may be moved to cause the sprocket to drive, at all times, on the lower run of the track. This is accomplished by insuring engagement of the sprocket teeth and lower track teeth in advance of any possible engagement with the upper track teeth and in practice, engagement with the upper track teeth is avoided. By this arrangement, the driving strain is localized on the stationary portion of the track which is in engagement with the ground and no driving strain is placed on the link connections, during the time that adjacent links are in relative motion, as when moving onto or from the idler wheels. By eliminating undue strain wherever there is relative motion, wear of the track is reduced to a minimum.

The track consists of a series of links or shoes 24 connected together by hinge pins 25. The shoe is preferably an integral casting comprising side walls 41 connected together by suitable transverse members. The side walls diverge from each other longitudinally forming a female end provided with bosses 42 through which the hinge pin passes. The male portion of the shoe is disposed substantially at the longitudinal center of the shoe and is provided with a cored transverse member 43 which, when the shoes are assembled, fits between the bosses 42 of the next adjacent shoe and the hinge pin passes through the bosses and the member 43. The member 43 is provided on its inner surface with an integral tooth 22, which is engaged by a sprocket tooth on the outer run of the track. The side plates extend past the tooth 22 on that side of the tooth remote from the bosses 42 and the inner surfaces of the extended side walls are curved downwardly on the radius of the lower surface of the member 43, to form a hook 45 which engages under the member 43 to prevent further rotational movement of one link with respect to the other. At the hook portion 45, the side walls are connected by a web 46, the inner surface of which is curved to conform to the curvature of the hook, forming a seat which bears against the outer side of the member 43 when the links reach a position of parallelism or approximate parallelism. The parts of the shoes are preferably so positioned and proportioned that the extended portion of one shoe seats against the central transverse member 43 of the other shoe as the two shoes approach parallelism, and before they reach parallelism, so that the extended track will lie in a shallow arc as shown in Figure 1, but the parts may be positioned and proportioned when desired, so that the shoes may move into parallelism. In the first instance, a slightly curved rigid track is produced and in the other case, a straight rigid track is produced.

Each shoe is provided intermediate its ends with an integral bottom plate or tread plate 47, extending transversely of the shoe and extending beyond the side walls. The tread plate is provided on its outer surface with a transversely extending rig or cleat 48 and between the side walls, the plate is provided with an outwardly extending curved portion 49, forming a grouser for increasing the tractive effect of the track on the ground. The tread plate 47 is of less length than the shoe and at its forward end is provided with an outwardly extending curved lip 51, the inner surface of which lies in a circle of which the axis of the hinge pin passing through the adjacent end of the shoe is the center. At its rear end, the tread plate is provided with an upwardly curved lip 52 the outer surface of which lies in a circle of which the axis of the hinge pin passing through the center of the shoe is the center. In assembly, the hinge pin passing through the end sockets of one shoe, passes centrally through the adjacent shoe, and the forward lip 51 on one shoe underlies the rear lip 52 on the adjacent shoe, and both lips are concentric with each other and have the axis of the same hinge pin as a center. The lips, which are in fact curved portions of the tread plates are preferably spaced apart radially, with relation to the axis of the pin, a slight distance, so that they are not in frictional contact, but are sufficiently close together to form a rather close joint between the successive tread plates of the track. As one link moves angularly with respect to the adjacent link, the hooked extension of one link moves down into the pocket within the link formed by the grouser 49 and the web 46 is provided with an outwardly extending rig 54 which contacts with the surface of the pocket and limits the inclination of one link with respect to the adjacent link. The permissible angular movement is sufficient to permit the track to flex as its passes over the idler wheels on the track frame. The side walls 41 of the shoes are provided at the female ends with track flanges 55, lying flush with the inner surfaces of the side walls and extending outwardly therefrom to the outer edges of the bosses 42. These track flanges extend backward to adjacent the central transverse member 43 and at their ends, the outer surfaces thereof are curved, so that these ends 56 make a close joint with the bosses 42 on the next succeeding shoe. The successive track flanges form a continuous track over which the tread surfaces 23 of the sprocket roll. By virtue of this construction there is provided a rigid track composed of one-piece shoes hinged together by pins which are not subjected to driving strain while they are subjected to angular movement of the shoes. This not only produces a minimum of wear on the track but reduces the rolling resistance of the tractor to a minimum.

I claim:

1. An endless flexible tractor track comprising a plurality of connected shoes, a pin bearing in each shoe at one end thereof, a pin bearing in each shoe adjacent the center thereof, the central bearing in one shoe being alined with the end bearing in the adjacent shoe, a pin extending through said bearings and a seat on the other end of each shoe adapted to engage the central bearing of the adjacent shoe.

2. An endless flexible tractor track comprising a plurality of connected shoes, a pin bearing in each shoe at one end thereof, a pin bearing in each shoe adjacent the center thereof, the central bearing in one shoe being alined with the end bearing in the adjacent shoe, a pin extending through said bearings, the other end of each shoe being movable into engagement with the pin bearing in the adjacent shoe to limit the angular movement of each shoe with relation to the adjacent shoe.

3. An endless flexible tractor track, comprising a plurality of shoes, pins pivotally connecting said shoes, one of said pins being disposed at one end of one shoe and the other being disposed substantially centrally of said shoe, a tread plate on each shoe, a concave lip on one end of said plate concentric with said first pin, and a convex lip on the other end of said plate concentric with said second pin, the concave lip on one tread plate underlying the convex lip on the adjacent tread plate.

4. A tractor track shoe comprising side walls having bearings therein at one end, a transverse member connecting said walls and having a bearing therein, a tread plate having a concave lip concentric with the first bearings and a convex lip concentric with the second bearing and a web connecting the side walls at a point remote from said bearings.

5. A tractor track shoe comprising side walls having bearings therein at one end, a transverse member connecting said walls and having a bearing therein, and extending above said walls, a tread plate connecting said walls, a concave lip on one end of said tread plate and a convex lip on the other end of said plate.

6. A tractor track shoe comprising side walls having bearings therein at one end, a transverse member connecting said walls and having a bearing therein, a tread plate having a depression therein between said walls connecting said walls and projecting beyond said walls, a concave lip on one end of said tread plate and a convex lip on the other end of said tread plate.

In testimony whereof, I have signed my name to this specification.

CLARENCE A. HENNEUSE.